United States Patent Office

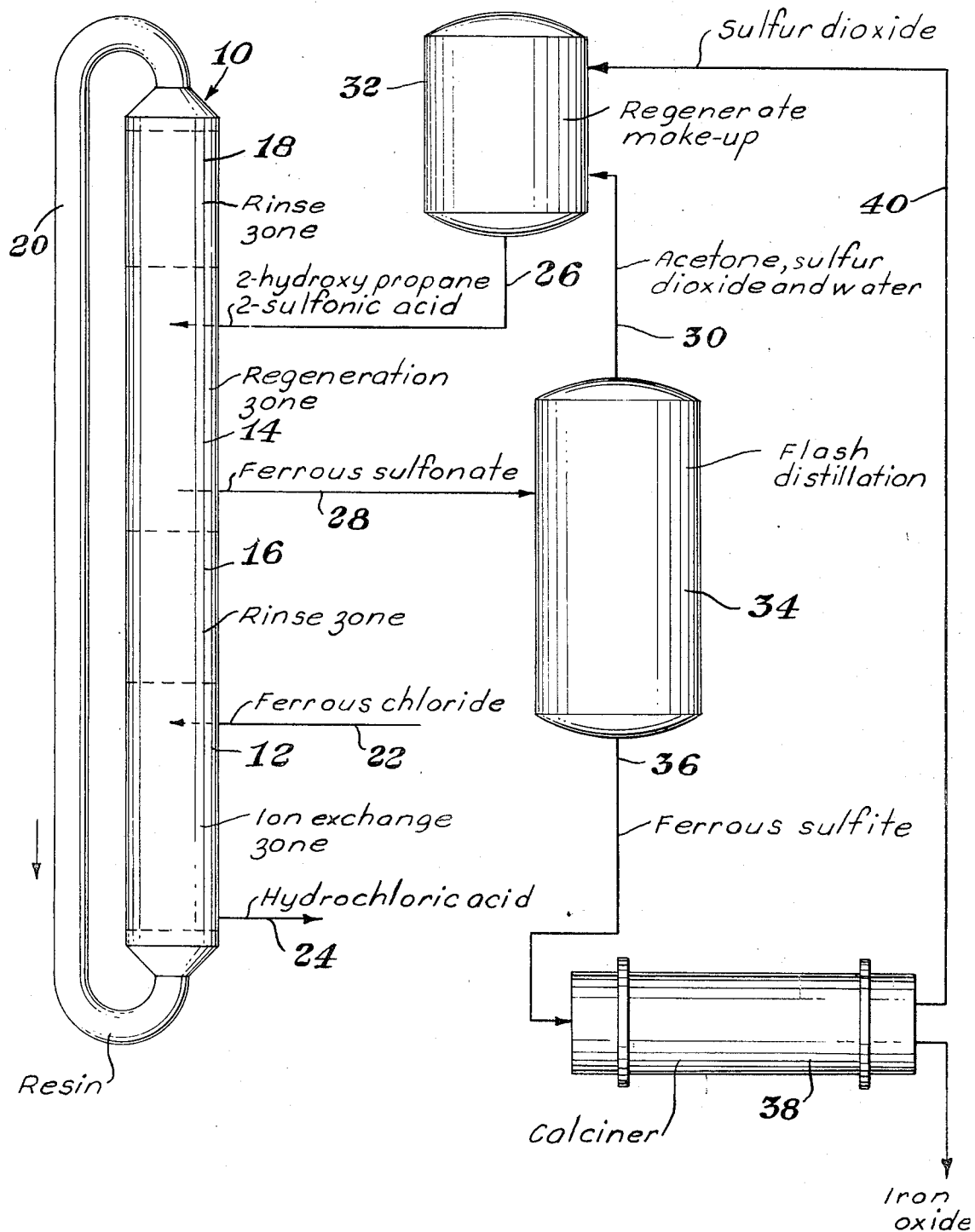

3,522,002
Patented July 28, 1970

3,522,002
TREATMENT OF SPENT HYDROCHLORIC ACID PICKLE LIQUOR FOR RECOVERY OF HYDROCHLORIC ACID
Leonard J. Lefevre, Midland, Mich., assignor to The Dow Chemical Company, Midland, Mich., a corporation of Delaware
Filed Dec. 26, 1967, Ser. No. 693,540
Int. Cl. C01b 7/08
U.S. Cl. 23—154
9 Claims

ABSTRACT OF THE DISCLOSURE

An ion exchange process is provided for the recovery of hydrochloric acid from spent hydrochloric acid pickle liquor. The process includes regeneration of the ion exchange material with a complex sulfonic acid, and treatment of the regenerant effluent to recover the complex sulfonic acid regenerant and to produce iron oxide suitable for use in steel making.

BACKGROUND

This invention relates to a process for treating spent pickle liquor. More particularly, it relates to an ion exchange process for treating spent hydrochloric acid pickle liquor to recover hydrochloric acid which includes regeneration of the ion exchange material and recovery and recycling of the regenerant used in the regeneration process.

In the pickling of metal products, particularly, steel, the metal is immersed in an acid bath to remove coatings of scale, oxides, rust, and the like from the metal. Pickling treatments are designed to produce a chemically clean surface on the metal product.

Sulfuric acid has been extensively used in the past as the pickling agent. The sulfuric acid reacts with the metal being treated during pickling to form waste products, such as ferrous sulfate, in spent pickle liquor. Sulfuric acid is relatively inexpensive and it has generally been believed to be more economical to merely discard the spent pickle liquor rather than to attempt to recover the sulfuric acid from its salt form.

In recent years, steel makers have begun to switch from sulfuric acid to hydrochloric acid as a pickling agent. Hydrochloric acid provides an increased pickling rate and a better surface on the product that can be obtained in sulfuric acid pickling. Hydrochloric acid, however, is considerably more expensive than sulfuric acid, and thus it has become more important to provide an economical process for recovering this acid from the spent liquor.

Further, disposing of the spent pickle liquor has been a serious problem in the past, regardless of whether a sulfuric or hydrochloric acid pickle is used. This problem can largely be eliminated by recovering the acid for reuse, thus further economizing on the overall operation of the process.

In pickling steel with hydrochloric acid, ferrous chloride is formed as a waste material in the spent pickle liquor. It has been proposed to roast this ferrous chloride directly to decompose it into hydrogen chloride, which can then be re-adsorbed in water to yield a usable acid, and iron oxide. While such roasting procedures are technically feasible, they have not proven economical, because of the high decomposition temperature of ferrous chloride (about 800° C.) and because the iron oxide produced in such a process is contaminated with minor amounts of chloride, making it totally unsuitable for further use in the steel making process.

Another process that has been proposed for the recovery of spent hydrochloric acid pickle liquors includes reacting the spent liquor, containing ferrous chloride, with ammonia and oxygen to produce iron oxide and a solution of ammonium chloride. The procedure for converting the ammonium chloride to hydrochloric acid is involved and expensive, however, since the ammonium chloride must be reacted with ammonium bisulfate to produce ammonium sulfate in hydrochloric acid, with the hydrochloric acid then being boiled off as hydrogen chloride and condensed back to the acid. This complex procedure represents a serious economic drawback to such a process.

It is therefore a primary object of this invention to provide a new, improved and economical process for the treatment of spent hydrochloric acid pickle liquor to recover hydrochloric acid.

Another object of this invention is to provide a new, improved, and economical process for the recovery of hydrochloric acid from spent pickle liquors that substantially eliminates the problem of disposing of pickle liquor waste.

Still another object of this invention is to provide an ion exchange process for the treatment of spent hydrochloric acid pickle liquors to recover hydrochloric acid.

Yet another object of a preferred embodiment of this invention is to provide an ion exchange process for the recovery of hydrochloric acid from spent hydrochloric acid pickle liquor which achieves the production of usable iron oxide as a by-product.

A further object of a preferred embodiment of this invention is to provide a cation exchange resin process for the recovery of hydrochloric acid from spent pickle liquor in which a complex sulfonic acid is used as the regenerant for the ion exchange resin.

Still a further object of this invention is to provide a new and improved process for treating spent hydrochloric acid pickle liquor that can be carried out in a simple, effective, and economical manner.

Additional objects and advantages will be set forth in part in the description which follows and in part will be obvious from the description, or may be learned by practice of the invention, the objects and advantages being realized and attained by means of the methods, improvements, and combinations of steps as particularly pointed out in the appended claims.

STATEMENT OF THE INVENTION

To achieve the foregoing objects and in accordance with its purpose, this invention, as embodied and broadly described, provides a process for the recovery of hydrochloric acid from spent hydrochloric acid pickle liquor containing ferrous chloride which comprises, (A) contacting the spent liquor with a cation exchange resin in hydrogen form to obtain a ferrous resin and hydrochloric acid, and thereafter (B) regenerating the cation exchange resin by contact with a solution of a complex sulfonic acid comprising the reaction product of sulfur dioxide, water, and a water-soluble aldehyde or ketone thereby removing the ferrous ions from the material, restoring the resin to hydrogen form, and producing an effluent containing ferrous sulfonate. The column effluent is then heated to substantially recover the carbonyl compound and a portion of the sulfur dioxide as distillate, leaving a residue of ferrous sulfite. The distillate is recycled to at least partially regenerate the cation exchange resin while the ferrous sulfite residue can be calcined to yield sulfur dioxide and iron oxide.

In a preferred embodiment a continuous flow a cation-exchanger resin, counter-current to the feed and regenerant streams, is employed. For use in the regenerant solution, water-soluble $C_1$–$C_8$ aldehydes and ketones are particularly suitable.

DESCRIPTION

The accompanying drawing, which is incorporated in and constitutes a part of this specification, illustrates an embodiment of the invention, and together with the description, serves to explain the principles of this invention.

The drawing is a schematic diagram of the ion exchange process of this invention showing the recovery of hydrochloric acid, the recovery and recycling of the regenerant for the ion exchange resin, and the production of iron oxide.

It is to be understood that both the foregoing general description and the following detailed description are exemplary and explanatory, but are not restrictive of this invention.

Reference will now be made in detail to the present preferred embodiment of the invention, an example of which is illustrated in the accompanying drawing.

The ion exchange system of this invention, like other ion exchange systems known in the art, is an equilibrium system both in the ion exchange phase of the process and in the regeneration phase. The invention utilizes an ion exchange resin that is brought into contact with the spent hydrochloric acid pickle liquor to be treated. Preferably, the resin is used in the form of a moving bed in which the resin is first brought into contact with the liquor in an ion exchange zone, then discharged to a regeneration zone where it is regenerated, and then recycled to the ion exchanger zone.

A countercurrent, continuous ion exchange reactor of the type described by Higgins U.S. Pat. 2,815,322 is particularly suitable for use in the process of this invention, and is schematically shown in the drawing. The continuous reactor, generally indicated at 10, includes an ion exchange zone 12, a regeneration zone 14, water rinse zones 16 and 18 immediately above the ion exchange and regeneration zones, respectively, and a recycling path 20.

As shown in the drawing, spent hydrochloric acid pickle liquor stream 22 is initially contacted with the ion exchange material in zone 12 of continuous reactor 10. The liquor contains an aqueous solution of ferrous chloride formed in the pickling treatment of steel and some hydrochloric acid. Broadly stated, the purpose of the ion exchange in zone 12 is to remove the ferrous ions in the liquor and replace them with hydrogen ions which form hydrchloric acid with the chloride ions present in the liquor. The hydrochloric acid is, of course, then available for further use as a pickling agent in the steel pickling process.

In accordance with this invention, the ion exchange material is a cation exchange resin in the hydrogen form, capable of providing hydrogen ions for exchange with the ferrous cations in the spent pickle liquor. Exemplary of cation exchange resins which may be used in the process of this invention are strong acid resins such as the sulfonated styrene-divinylbenzene copolymers commercially available under the trade names Dowex 50W–X8, from The Dow Chemical Company, Amberlite IR–120, from Rohm & Haas Company, Ionac C–240, from Ionac Chemical Company, and the like. A preferred cation exchange resin for use in the process of this invention is Dowex–50W–X8 resin.

The spent pickle liquor to be treated is passed through the resin in continuous reactor 10 to remove its ferrous ions. The reaction that occurs in ion exchange zone 12 can be exemplified by the following equation in which $RSO_3^-$ represents the cation exchanger resin:

$$FeCl_2 + 2RSO_3H \rightarrow Fe(RSO_3)_2 + 2HCl$$

The ferrous chloride in spent pickle liquor 22 is thus converted to its acid component producing an effluent 24 containing hydrochloric acid.

Spent cation exchange resin from zone 12, containing ferrous ions, is then passed through rinse zone 16 where the resin is washed with water to prevent cross-contamination between the hydrochloric acid formed in ion exchange zone 12 and the acid used in regeneration zone 14. While it is not essential to rinse the spent resin following ion exchanger, such a rinse step is desirable because the presence of chloride ion in the resin would present a serious corrosion problem in the subsequent regenerant recovery step of this invention.

In accordance with this invention, the spent, and desirably rinsed, cation exchange resin containing ionically bound ferrous cations is regenerated in regeneration zone 14 by contacting the resin with a complex sulfonic acid solution such as described by Wilson U.S. Pat. 3,248,278. This sulfonic acid solution is prepared by adsorbing sulfur dioxide in an aqueous solution of a suitable water-soluble aldehyde or ketone to produce a strong, complex sulfonic acid by the reaction:

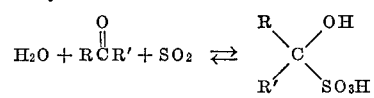

where

is the aldehyde or ketone. This complex sulfonic acid ($ZSO_3H$) is a highly effective resin regenerant in the present system.

Exemplary of carbonyl compounds suitable for use in the preparation of the complex sulfonic acid are water-soluble $C_1$–$C_8$ aldehydes and ketones, such as acetone, methyl ethyl ketone, acetaldehyde, formaldehyde, furfuraldehyde, isobutyraldehyde, cyclohexanone, benzaldehyde, methyl isobutyl ketone, mesityl oxide, and salicylaldehyde. Acetone is preferred for use in the process of this invention and reacts with sulfur dioxide and water to produce 2-hydroxypropane-2-sulfonic acid.

At room temperature maximum ionization of the complex sulfonic acid can be most economically achieved in the production of the complex sulfonic acid using a weight ratio of about 7 parts water to about 1 part of acetone. Increasing the ratio of acetone to water above 7 to 1 only insignificantly increases the solubility of sulfur dioxide in the mixture at 20°–25° C. An optimum sulfonic acid composition would utilize a minimum amount of acetone or other carbonyl compound, both because the carbonyl compound is the most expensive reagent in the system and because the solution should be as aqueous as possible to maximize ionization of the acid. At a weight ratio of 7 parts water to 1 part acetone, the complex sulfonic acid solution contains about 11% acetone, 12% sulfur dioxide, and 77% water, and has a normality roughly equivalent to a 2 N acid.

Complex sulfonic acid solution 26 containing $H^+$ cations and $ZSO_3^-$ anions is brought into contact with the spent cation exchange resin in regeneration zone 14 of continuous reactor 10. In this regeneration reaction, the hydrogen ions of the sulfonic acid solution are exchanged for the ferrous ions in the cation exchange resin to produce an effluent 28 containing ferrous sulfonate. The cation regeneration reaction can be exemplified by the following equation:

$$Fe(RSO_3)_2 + 2H^+ + 2ZSO_3^- \rightarrow 2RSO_3H + Fe(ZSO_3)_2$$

The ferrous cations are thus removed from the resin as sulfonates and the resin is returned to the hydrogen form for further use in the initial treatment of spent pickle liquor. Ferrous sulfonate is relatively soluble in water and thus regenerant effluent 28 is an aqueous solution containing dissolved ferrous sulfonate.

The regenerated ion exchange resin from regeneration zone 14 of continuous reactor 10 is then passed through rinse zone 18 where it is washed with water to avoid loss of residual sulfonic acid in the resin following regeneration. While it is not essential to rinse the regenerated resin, the rinsing step is preferred because the carryover of sulfonic acid in the regenerated resin represents a loss of sulfur dioxide and the carbonyl compound. The regenerated, and desirably rinsed, cation exchange resin is recycled from rinse zone 18 through passage 20 for reuse in ion exchange zone 12 of reactor 10.

In accordance with a preferred embodiment of this invention, regenerant effluent 28 is treated to recover its carbonyl and sulfur dioxide components for further use in the regeneration of cation exchange resin. This recovery procedure is preferably carried out by thermal distillation of the regenerant effluent at about 100° C. in a suitable vessel 34. Such distillation effectively strips the carbonyl compound, a portion of the sulfur dioxide, and some water from effluent 28 as distillate 30. Since all of distillate 30 is to be recombined to form the complex sulfonic acid regenerant, the distillate can be immediately passed to regenerant make-up tank 32 without the need for separating it into its various components.

Distillation of regenerant effluent 28 also produces an insoluble precipitate of ferrous sulfite, as can be exemplified by the following equation:

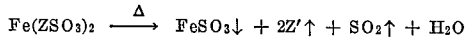

where Z' is the aldehyde or ketone originally used to form the sulfonic acid regenerant.

While ferrous sulfonate can be decomposed in this equation at a temperature as low as about 100° C., the decomposition reaction is preferably carried out at about 250° C. to substantially remove all water from the product as water vapor, leaving an essentially dry ferrous sulfite product 36.

In accordance with a preferred embodiment of this invention, the dry ferrous sulfite product is calcined in rotary kiln 38 at a temperature of about 450° C. to decompose it and form sulfur dioxide and ferrous oxide. Decomposition of ferrous sulfite can be exemplified by the following equation:

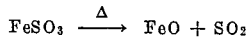

The sulfur dioxide given off by decomposition of ferrous sulfite is recycled at 40 to regenerant make-up vessel 32, thus providing for the substantial recovery of all of the sulfur dioxide used in preparing the cation regenerant solution.

The iron oxide produced in calciner 38 may contain trace amounts of elemental sulfur, but it is not contaminated with chloride and therefore can be used in the steel making process.

It will be apparent from the foregoing description that this invention provides a simple, economical, and effective method for the recovery of hydrochloric acid from spent hydrochloric acid pickle liquor having several important advantages not heretofore realized in prior art processes. Such advantages include elimination of the problem of disposing of pickle liquor wastes, since the hydrochloric acid and iron oxide recovered by the process are both useful in the steel making process.

Further, the chemical agent used to regenerate the ion exchange resin in the process of this invention is recovered substantially in its original form, and thus little or no cost is encountered in the replenishment of the regenerant once the process is on stream.

For a clearer understanding of this invention, specific examples of it are set forth below. These examples are merely illustrative and are not intended to limit the scope and underlying principles of the invention in any way.

EXAMPLE 1—REGENERANT SOLUTION

This example illustrates the preparation of 2-hydroxy-propane-2-sulfonic acid as a regenerant for the cation exchange resin.

The complex sulfonic acid is prepared by adsorbing sulfur dioxide gas in mixtures containing various ratios of water to acetone in a gas adsorption column. The adsorption column consists of a 1-inch glass tube filled to a depth of about 8 inches with berl saddles and topped with a 3-bulb condenser.

Sulfur dioxide is fed into the bottom of the adsorption column through a fritted-glass sparger at a point just below the level of packing in the column. The liquid mixture of acetone and water is introduced into the column above the level of the packing by means of a pump. The liquid mixture drains down through the packing and out the bottom of the column into a 2-liter flask fitted with a reflux condenser. The mixture is condensed and then recycled through the pump to the top of the adsorber.

The sulfonic acid compositions prepared by this procedure using different ratios of water to acetone and various adsorption periods at room temperature are shown in Table I below.

TABLE I

| Weight ratio of $H_2O$/acetone | Contact time (hrs.) | Normality of acid |
|---|---|---|
| 1/1 | 1 | 1.8 (lower phase)[a] |
| 1/1 | 1.75 | $\{2.09; \rho=1.072\}$[a] $\{3.43; \rho=0.989\}$ |
| 2/1 | 2 | 1.95 |
| 2/1 | 3 | 2.48 [b] |
| 3/1 | 1 | 1.7 |
| 3/1 | 4 | 2.1 |
| 5/1 | 2 | 0.4 |
| 5/1 | 3 | 1.02 |
| 5/1 | 5 | 1.96 |
| 9/1 | 1 | 0.87 |
| 9/1 | 2 | 1.45 |
| 9/1 | 3 | 1.64 |
| 9/1 | 4 | 1.72 |
| 9/1 | 5 | 1.90 |

[a] Liquid separated into two phases.
[b] Supersaturated.

From the results of this table it can be seen that the solubility of sulfur dioxide in the mixture reaches a maximum concentration of roughly about 2 N at 20°–25° C. regardless of the weight ratio of water to acid, although higher ratios require longer contact times to achieve maximum sulfur dioxide absorption. The optimum sulfonic acid composition produced by this procedure is found to have a weight ratio of about seven (7) parts water to one (1) part acetone. At this weight ratio, a 2 N acid solution contains about 11% acetone, 12% sulfur dioxide, and 77% water.

EXAMPLE 2—RECOVERY OF HCl

This example illustrates the removal of hydrochloric acid from a solution containing ferrous chloride with a cation exchange resin, and the utilization, recovery and recycling of a complex sulfonic acid regenerant for the resin.

Cation removal

An aqueous solution of 10% ferrous chloride is passed in excess through a buret containing 90 ml. of Dowex 50W-X8 resin having a mesh size of 50 to 100. The resin has an operating capacity of 1.45 meq./ml., thus adsorbing a maximum of 130 meq. (90 ml. x 1.45 meq./ml.) of ferrous ions.

The reaction produces an effluent containing 130 meq. of hydrogen ions as free hydrochloric acid, the ferrous cations having been absorbed by the resin and exchanged for the hydrogen ions from the resin.

Regeneration of cation exchange resin

The spent cation exchange resin is then regenerated with the 2 N (2 meq./ml.) acid solution of 2-hydroxy-propane-2-sulfonic acid prepared in Example 1. Since in a batch operation the resin can be regenerated from the ferrous to the hydrogen form with this acid to the extent of about 70% at an acid efficiency of roughly 70%, 185 ml. (130/0.7) are used to regenerate the resin. The regenerant effluent contains 130 meq. of ferrous ions, 240 meq. hydrogen ions, and 370 meq. of $ZSO_3^-$ anions; 130 meq. of hydrogen ions in the sulfonic acid solution having been adsorbed by the resin and exchanged for the ferrous cations. With a continuous moving bed column, the resin can be regenerated to well over 90% with better than 90% acid efficiency.

Recovery of regenerant from regenerant effluent

The regenerant effluent is flash distilled at 250° C. to recover substantially all of the acetone and water and approximately 305 mmoles of sulfur dioxide. Removal of sulfur dioxide from the effluent produces a precipitate of approximately 8.8 grams of ferrous sulfite (130 meq. of $Fe^{++}$ and 130 meq. of $SO_3^=$). The acetone, sulfur dioxide, and water flashed from the effluent are recycled to the regenerant make-up tank for use in preparation of additional regenerant.

EXAMPLE 3.—SULFUR DIOXIDE RECOVERY

The ferrous sulfite precipitate in Example 2 is calcined at about 450° C. to decompose it and produce 63 mmoles of sulfur dioxide and approximately 4.8 grams of ferrous oxide.

The recovered sulfur dioxide can be recycled to the regenerant make-up tank to fortify the $SO_2$ obtained in the distillation step. The regenerant make-up tank thus contains 370 mmoles of sulfur dioxide which will react with acetone and water to produce 370 meq. of 2-hydroxypropane-2-sulfonic acid.

EXAMPLE 4.—RECOVERY OF HCl

To further illustrate the hydrochloric acid recovery process of this invention, 90 ml. of the cation exchange resin of Example 2 is exhausted with an excess of 10% ferrous chloride solution containing 0.2% hydrochloric acid. The resin thus contains a maximum of 166 meq. of ferrous ions.

The column is eluted with an excess of the 2 N, 2-hydroxypropane-2-sulfonic acid prepared in Example 1. The effluent from the column is collected in cuts and titrated to determine its ferrous ion and free acid contents. The results of this example are shown in Table II below.

TABLE II

| Cut | Effluent volume (ml.) | Normality | | |
|---|---|---|---|---|
| | | Ferrous ions | Hydrogen ions[a] | Ferrous plus hydrogen ions |
| 1 | 30–56 | 1.19 | .12 | 1.31 |
| 2 | 57–86 | 1.61 | .12 | 1.73 |
| 3 | 87–108 | .80 | 1.36 | 2.16 |
| 4 | 109–132 | .50 | 1.68 | 2.18 |
| 5 | 133–156 | .36 | 1.78 | 2.14 |
| 6 | 157–182 | .28 | 1.41 | 1.69 |
| 7 | 183–208 | .21 | 1.73 | 1.94 |

[a] Concentration of sulfonic acid in effluent.

The results of this example show that almost half of the ferrous ion can be removed with an acid efficiency of over 90%. Thus if the process were run in a countercurrent manner, as in a continuous contactor, the resin could be regenerated to a high level with high acid efficiency. But in a fixed column operation, an optimum level of operation is about 70% resin regeneration at a 70% acid efficiency. All of the iron is removable.

After about six (6) times the amount of sulfonic acid solution theoretically required to remove all of the ferrous ions has been passed through the column, the column is rinsed, the resin removed, and an aliquot of the resin is titrated to determine its ion-exchange capacity. The resin is found to be substantially regenerated.

EXAMPLE 5.—RECOVERY OF REGENERANTS

This example illustrates the thermal distillation of the regenerate effluent to recover the regenerants for the cation exchange resin.

A 1-inch column container 445 ml. of Dowex 50W–X8 resin is exhausted with a 10% ferrous chloride solution and then regenerated with excess 2-hydroxypropane-2-sulfonic acid made by adsorbing sulfur dioxide in a 2 to 1 weight ratio mixture of water and acetone. The sulfonic acid solution had a normality of approximately 2.2.

The first 150 ml. of regenerant effluent is discarded. Then a 486-gram cut is taken and a sample analyzed for its content of acetone, sulfur dioxide, and water with the results shown in line 1 of Table III below.

The remaining effluent cut is then distilled at less than 100° C. and the distillate is taken in cuts and analyzed for its content of acetone, water, and sulfur. The results of this analysis of the distillate are also shown in Table III below. These results show that about 75% of the acetone and about 30% of the sulfur dioxide are distilled out of the effluent at temperatures below 100° C.

The temperature of the distillation equipment is then raised to between 240° to 250° C. and the residue of 313.5 grams is distilled to dryness. The results of this distillation

TABLE III

| | Weight (gms.) | Acetone | | Sulfur dioxide | | Water | | Distillation temperatures and pressure | | |
|---|---|---|---|---|---|---|---|---|---|---|
| | | Percent | Weight (gms.) | Percent | Weight (gms.) | Percent | Weight (gms.) | Pot temp. (° C.) | Head temp. (° C.) | Pressure (mm.) |
| Effluent[a] | 420 | 12.7 | 53.4 | 10.58[b] | 44.5 | 76.30 | 320 | | | |
| Distillate: | | | | | | | | | | |
| Cut 1 | 27.0 | 54.5 | 14.7 | 13.86[b] | 3.7 | 1.92 | 0.5 | 73–87 | 48–57 | 746 |
| Cut 2 | 35.0 | 70.3 | 24.6 | 21.64[b] | 7.6 | 1.17 | 0.4 | 87–96 | 55–63 | 746 |
| Cut 3 | 3.5 | | | 22.0[b] | 0.8 | | | 96–97 | 63–93 | 746 |
| Cut 4 | 13.0 | | | | | | | (c) | (c) | 746 |
| Cut 5 | 23.0 | | | 0.56[d] | 0.1 | | | 54 | 53 | 100 |
| Cut 6 | 2.5 | | | 33.6[d] | 0.8 | | | (c) | (c) | 100 |
| Totals | 104.0 | | 39.3 | | 13.0 | | 0.9 | | | |
| Residue | 313.5[e] | | | | | | | | | |
| Distillate from residue | 272 | | | 2.34[c] | 6.4 | | | 240–250 | 98 | 760 |
| Solid residue | 18 | | | 10.12[b] | 1.8 | | | | | |

[a] Effluent also contained 24 grams of iron.
[b] Total sulfur expressed as sulfur dioxide.
[c] Cold trap.
[d] Sulfur dioxide by direct titration.
[e] 275 grams of liquid and 38.5 grams of solid.

are also shown in Table III. About 14% of the original sulfur dioxide content is recovered from the effluent in this high temperature distillation step.

The invention in its broader aspects is not limited to the specific details shown and described and departures may be made from such details within the spirit and scope of the accompanying claims without departing from the principles of the invention and without sacrificing its chief advantages.

What is claimed is:

1. A process for the recovery of hydrochloric acid from spent hydrochloric acid pickle liquor containing ferrous chloride which comprises:
    (A) contacting the spent liquor with a cation exchange resin in hydrogen form thereby exchanging the hydrogen ions from the cation exchange resin for the ferrous ions in the liquor, said hydrogen ions forming hydrochloric acid with the chloride ions in the liquor;

(B) regenerating the cation exchange resin by contacting it with a complex sulfonic acid solution comprising the reaction product of sulfur dioxide, water, and a water-soluble aldehyde or ketone to remove the ferrous ions from the cation exchange resin, restore the material to the hydrogen form, and produce a regenerant effluent containing ferrous sulfonate;

(C) heating the regenerant effluent to recover the aldehyde or ketone and sulfur dioxide as distillate and form ferrous sulfite as a residue and recycling the distillate for use in preparing additional sulfonic acid regenerant.

2. The process of claim 1, which includes the step of calcining the ferrous sulfite residue to decompose the ferrous sulfite and yield sulfur dioxide and iron oxide.

3. The process of claim 2, wherein the sulfur dioxide obtained from the calcining step is recycled for use in preparing additional sulfonic acid regenerant.

4. The process of claim 1, wherein the aldehyde or ketone is a water-soluble $C_1$–$C_8$ aldehyde or ketone.

5. The process of claim 4 wherein the ketone is acetone.

6. The process of claim 5, wherein the sulfonic acid solution comprises by weight about 11% acetone, 12% sulfur dioxide, and the balance essentially water.

7. The process of claim 1, wherein the cation exchange material is a sulfonic acid resin.

8. The process of claim 7, wherein the cation exchange material is a sulfonated styrene-divinylbenzene copolymer resin.

9. The process of claim 1, which includes rinsing the ion exchange material with water after contacting it with spent liquor to remove residual hydrochloric acid in the material and again rinsing it with water following regeneration to remove residual complex sulfonic acid in the regenerated material.

References Cited

UNITED STATES PATENTS

| | | |
|---|---|---|
| 2,334,904 | 11/1943 | Cheetham. |
| 2,695,875 | 11/1954 | McGarvey _____ 23—154 XR |
| 3,096,153 | 7/1963 | Hadzeriga _____ 23—154 XR |
| 3,316,171 | 4/1967 | Mastrorilli _____ 23—154 XR |
| 3,441,376 | 4/1969 | Anderson _____ 23—154 XR |

EDWARD STERN, Primary Examiner

U.S. Cl. X.R.

23—129, 177, 200; 210—38; 260—503